United States Patent
Xiang et al.

(10) Patent No.: US 11,780,551 B1
(45) Date of Patent: Oct. 10, 2023

(54) NON-SINGULAR FINITE-TIME CONTROL METHOD AND SYSTEM FOR DYNAMIC POSITIONING OF UNMANNED BOAT WITH PRESCRIBED PERFORMANCE

(71) Applicant: HUAZHONG UNIVERSITY OF SCIENCE AND TECHNOLOGY, Hubei (CN)

(72) Inventors: Xianbo Xiang, Hubei (CN); Yu Duan, Hubei (CN); Jinjiang Li, Hubei (CN); Qin Zhang, Hubei (CN); Shaolong Yang, Hubei (CN); Gong Xiang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/324,168

(22) Filed: May 26, 2023

(30) Foreign Application Priority Data

Oct. 28, 2022 (CN) .......................... 202211336276.8

(51) Int. Cl.
*G05D 1/02* (2020.01)
*B63H 25/04* (2006.01)

(52) U.S. Cl.
CPC ........... *B63H 25/04* (2013.01); *G05D 1/0206* (2013.01)

(58) Field of Classification Search
CPC ...... B63H 25/04; G05D 1/0206; B63B 34/05; B63B 21/58; B63B 35/14; B63B 35/00;
(Continued)

(56) References Cited

U.S. PATENT DOCUMENTS

| | | | | |
|---|---|---|---|---|
| 3,533,458 A | * | 10/1970 | McColl | ................ A01G 23/085 144/337 |
| 3,545,509 A | * | 12/1970 | Baxter, Jr. | ......... A01G 23/0955 30/379 |

(Continued)

OTHER PUBLICATIONS

Rasitha et al., Lateral-directional autopilot design of Unmanned Aerial Vehicles using quaternion feedback sliding mode approach, 2015, IEEE, p. 125-130 (Year: 2015).*

(Continued)

*Primary Examiner* — Mcdieunel Marc
(74) *Attorney, Agent, or Firm* — JCIPRNET

(57) ABSTRACT

Disclosed are a non-singular finite-time control method and system for prescribed performance dynamic positioning of unmanned boat, which belong to the field of automatic control of unmanned boats. The method includes obtaining a difference between the actual measured position and the desired position of the unmanned boat to obtain a position error of the unmanned boat; performing prescribed performance transformation on the unmanned boat position error; constructing a non-singular finite-time virtual velocity law as a reference velocity for unmanned boats; obtaining the difference between the reference speed and the actual measured speed to obtain the speed tracking error; calculating the fuzzy supervisory saturation compensated law and adaptive fuzzy approximation term; constructing a non-singular finite-time dynamical controller to output control commands; applying a force or moment to the unmanned boat to adjust the propeller speed of the unmanned boat, thereby realizing positioning of the unmanned boat.

8 Claims, 4 Drawing Sheets

(58) Field of Classification Search
CPC .... B63B 2035/008; B63G 8/16; B63G 8/001; B63G 8/39; B63G 8/38; B63G 2008/005; B63C 11/52; A01K 97/02; A01K 99/00; G01S 15/96

See application file for complete search history.

(56) References Cited

U.S. PATENT DOCUMENTS

| | | | | |
|---|---|---|---|---|
| 4,269,241 | A * | 5/1981 | Hickman | A01G 3/08 144/34.1 |
| 4,763,742 | A * | 8/1988 | Langford | B62D 55/065 180/41 |
| 4,823,852 | A * | 4/1989 | Langford | B62D 55/065 180/41 |
| 5,351,783 | A * | 10/1994 | Celli | B66B 9/02 182/141 |
| 7,997,311 | B2 * | 8/2011 | Prout, Jr. | A01G 7/06 144/208.2 |
| 8,517,066 | B1 * | 8/2013 | Van De Mortel | B27L 1/06 144/24.13 |
| 9,370,142 | B2 * | 6/2016 | Barnhill | B25J 9/0009 |
| 10,485,171 | B1 * | 11/2019 | Mekhtiche | A01D 46/22 |
| 10,486,302 | B2 * | 11/2019 | Hayden | B25J 5/00 |
| 2014/0060701 | A1 * | 3/2014 | Van De Mortel | B27L 1/06 144/343 |

OTHER PUBLICATIONS

DeBitetto, Fuzzy logic for depth control of Unmanned Undersea Vehicles, 1995, IEEE, p. 324-248 (Year: 1995).*

Ashrafiuon et al., Review of nonlinear tracking and setpoint control approaches for autonomous underactuated marine vehicles, 2010, IEEE, p. 5203-5211 (Year: 2010).*

Bertaska et al., Experimental Evaluation of Supervisory Switching Control for Unmanned Surface Vehicles, 2019, IEEE, p. 7-28 (Year: 2019).*

* cited by examiner

NON-SINGULAR FINITE-TIME CONTROL METHOD AND SYSTEM FOR DYNAMIC POSITIONING OF UNMANNED BOAT WITH PRESCRIBED PERFORMANCE

CROSS-REFERENCE TO RELATED APPLICATION

This application claims the priority benefit of Chinese application serial no. 202211336276.8, filed on Oct. 28, 2022. The entirety of the above-mentioned patent application is hereby incorporated by reference herein and made a part of this specification.

BACKGROUND

TECHNICAL FIELD

The disclosure belongs to the field of automatic control of unmanned boats, and more specifically relates to a non-singular finite-time control method and system for prescribed performance dynamic positioning of unmanned boat.

DESCRIPTION OF RELATED ART

In the past decades, a lot of developments related to ocean have been conducted, and unmanned boats have been widely adopted. When performing tasks such as oil drilling and laying submarine pipeline in deep sea areas, due to the restriction of length of the mooring cable, it is difficult to perform positioning tasks through the conventional anchoring method. The dynamic positioning technology that resists environmental disturbances through the self-propulsion system of the unmanned boat makes it possible to perform positioning tasks without mooring, thereby reducing the complicated anchoring process and it is possible to conduct tasks in water at a depth greater than 1000 meters. On the one hand, the positioning accuracy may be ensured, and on the other hand, the cost required for conventional mooring positioning may be saved.

In recent years, dynamic positioning control has been extensively studied by scholars worldwide. Based on non-linear and intelligent control theories, various controllers have been proposed, but these controllers can only ensure that the positioning error is eventually and consistently bounded or asymptotically stable when the time is infinite. Although the finite-time control that has emerged in recent years is able to achieve the goal of control in a finite time, the integration of power terms may bring potential singularity, and it is difficult to precisely constrain the error state in the transient process. In the actual task of performing dynamic positioning of unmanned boat, considering that there are many uncertain factors in the surrounding environment of unmanned boat, it is very important to avoid singularity in the control process and ensure that the error converges within a finite time.

SUMMARY

To solve the defects of related art, the purpose of the present disclosure is to provide a non-singular finite-time control method and system for prescribed performance dynamic positioning of unmanned boat. The present disclosure aims to solve the problem of singularity phenomenon that occurs when the finite time converges in the case where positioning of unmanned boat is performed through the existing dynamic positioning control method.

In order to achieve the above purpose, on the one hand, the present disclosure provides a non-singular finite-time control method for prescribed performance dynamic positioning of unmanned boat, and the method includes the following steps: obtaining a difference between the actual measured position and the desired position of the unmanned boat to obtain a position error of the unmanned boat; performing prescribed performance transformation after decomposing the unmanned boat position error according to the longitudinal transformation position, lateral transformation position and heading transformation position to obtain prescribed performance error transformation variables; constructing a non-singular finite-time virtual velocity law as a reference velocity for unmanned boats based on prescribed performance error transformation variables and non-singular finite-time operators; obtaining the difference between the reference speed and the actual measured speed to obtain the speed tracking error; integrating the speed tracking error with the deviation between the control command and the saturation limit to calculate the fuzzy supervisory saturation compensated law by constructing fuzzy supervisory compensated; integrating the speed tracking error to construct a fuzzy logic system to calculate the adaptive fuzzy approximation term; calculating a robust term according to speed tracking error and an adaptive estimation term of compounded disturbances with unknown upper bound; introducing a kinematically non-singular finite-time control term and combining fuzzy supervisory saturation compensated law, adaptive fuzzy approximation term and robust term to construct a non-singular finite-time dynamical controller to output control commands; the control commands contain a force or a moment pre-applied on the unmanned boat; applying a force or moment to the unmanned boat to adjust the propeller speed of the unmanned boat, thereby realizing positioning of the unmanned boat.

Further preferably, the non-singular finite-time virtual velocity law is $$\alpha = -\frac{J(\psi)^T G^{-1} \tilde{\alpha} \tilde{\alpha}^T z_1}{\sqrt{z_1^T \tilde{\alpha} \tilde{\alpha}^T z_1 + \delta_1^2}}.$$

In the formula, $J(\Psi)$ is the rotation matrix that transforms the unmanned boat hull coordinate system into a fixed coordinate system; $J\Psi^T$ is the transpose matrix of $J(\Psi)$; $\Psi$ represents the heading angle of the unmanned boat; G is the prescribed performance gain matrix; $G^{-1}$ is the inverse matrix of G; $\delta_1$ is a small positive definite parameter; $Z_1$ is the transformed position error vector; $\tilde{\alpha}$ is the intermediate control variable for calculating the non-singular finite-time virtual velocity law, and the calculation is performed by using a non-singular finite-time operator.

Further preferably, the adaptive fuzzy approximation term is $$\tau_{mod} = \frac{1}{2}\dot{\sigma}\theta_\tau^T \theta_\tau \hat{e}.$$

In the formula, ê is the speed tracking error;

$$\theta_\tau = \begin{bmatrix} \vartheta_{\tau1}^T & 0_{1\times l} & 0_{1\times l} \\ 0_{1\times l} & \vartheta_{\tau2}^T & 0_{1\times l} \\ 0_{1\times l} & 0_{1\times l} & \vartheta_{\tau3}^T \end{bmatrix}^T,$$

$\hat{\sigma}$ is the optimal estimated value of the two norm of the optimal weight matrix $\sigma=\|\omega_\tau^*\|^2$, $\hat{\sigma}=\text{diag}(\hat{\sigma}_1, \hat{\sigma}_2, \hat{\sigma}_3)$; $\omega_\tau^*$ and $\delta_{\tau k}$ are respectively the optimal weight and the Gaussian fuzzy basis function used to approximate the unknown model dependency term.

The fuzzy supervisory saturation compensated law is $$\tau_{sup} = -\frac{1}{2}\Upsilon\hat{\phi}\theta_{\Delta\tau}^T\theta_{\Delta\tau}\hat{e}.$$

In the formula, $\gamma$ is the switching factor based on the saturation command deviation, when $\gamma$ reaches the set threshold, $\gamma=1$, otherwise $\gamma=0$; $\theta_{\Delta\tau}^T$, is the transpose matrix of $\theta_{\Delta\tau}$; ê is the speed tracking error;

$$\theta_{\Delta\tau} = \begin{bmatrix} \vartheta_{\Delta\tau1}^T & 0_{1\times l} & 0_{1\times l} \\ 0_{1\times l} & \vartheta_{\Delta\tau2}^T & 0_{1\times l} \\ 0_{1\times l} & 0_{1\times l} & \vartheta_{\Delta\tau3}^T \end{bmatrix},$$

$\hat{\phi}$ is the optimal estimated value of the two norm of the optimal weight matrix $\phi=\|\omega_{\Delta\gamma}^*\|^2$; $\omega_{\Delta\gamma}^*$ and $\delta_{66\,\gamma k}$ are respectively the optimal weight matrix and Gaussian fuzzy basis function for approximating the fuzzy logic system with unknown saturation deviation $\Delta\tau$; Where k is 1, 2 or 3; l is a positive integer; T stands for transpose.

Further preferably, the non-singular finite-time dynamics controller is $$T_{sat} = -\frac{\breve{\tau}_{sat}\breve{\tau}_{sat}^T\hat{e}}{\sqrt{\hat{e}^T\breve{\tau}_{sat}\breve{\tau}_{sat}^T\hat{e}+\delta_2^2}}.$$

In the formula, $\delta_2$ is a normal number with a small value; $\breve{\tau}_{sat}$ is the calculation of non-singular dynamics intermediate control variables; $\tau_{sat}$ sat is the control command; ê is the speed tracking error.

The robust term is $\tau_{rob}=-\text{TANH}(\hat{e})\hat{E}$.

In the formula, $\hat{E}$ is the adaptive estimation term of the compounded disturbances with unknown upper bound; ê is the speed tracking error.

In another aspect, the present disclosure provides a non-singular finite-time control system for prescribed performance dynamic positioning of unmanned boat, and the system includes a sensor, a first subtractor, a prescribed performance mapping unit, a second subtractor, a virtual velocity law construction unit, a fuzzy supervisory compensated constructing unit, a fuzzy logic system constructing unit, a robust adaptive estimation constructing unit, and a non-singular finite-time dynamical controller constructing unit.

The output end of the sensor is connected to the input end of the first subtractor and the second subtractor. The output end of the first subtractor is connected to the input end of the prescribed performance mapping unit. The output end of the prescribed performance mapping unit is connected to the input end of the virtual velocity law constructing unit. The output end of the virtual velocity law constructing unit is connected to the second subtractor. The output end of the second subtractor is connected to the fuzzy supervisory compensated constructing unit, the fuzzy logic system constructing unit, the robust adaptive estimation constructing unit, and non-singular finite-time dynamical controller constructing unit.

The sensor is provided to collect the actual measured speed and position of the unmanned boat in real time. The first subtractor is provided to obtain a difference between the actual measured position and the desired position of the unmanned boat to obtain the position error of the unmanned boat.

The prescribed performance mapping unit is provided to perform prescribed performance transformation after decomposing the unmanned boat position error according to the longitudinal transformation position, lateral transformation position and heading transformation position to obtain prescribed performance error transformation variables.

The virtual speed law constructing unit is provided to construct a non-singular finite-time virtual speed law as the reference speed of the unmanned boat based on the prescribed performance error transformation variable and the non-singular finite-time operator.

The second subtractor is provided to obtain a difference between the reference speed and the actual measured speed to obtain a speed tracking error.

The fuzzy supervisory compensated constructing unit is provided to integrate the speed tracking error with the deviation between the control command and the saturation limit to calculate the fuzzy supervisory saturation compensated law by constructing fuzzy supervisory compensated.

The fuzzy logic system constructing unit is provided to integrate the speed tracking error to construct a fuzzy logic system to calculate the adaptive fuzzy approximation term.

The robust adaptive estimation constructing unit is provided to calculate a robust term according to speed tracking error and an adaptive estimation term of compounded disturbances with unknown upper bound.

The non-singular finite-time dynamical controller constructing unit is provided to introduce a kinematically non-singular finite-time control term and combine fuzzy supervisory saturation compensated law, adaptive fuzzy approximation term and robust term to construct a non-singular finite-time dynamical controller to output control commands; the control commands contain a force or a moment pre-applied on the unmanned boat; a force or moment is applied to the unmanned boat to adjust the propeller speed of the unmanned boat, thereby realizing positioning of the unmanned boat.

Further preferably, the non-singular finite-time virtual velocity law is $$\alpha = -\frac{J(\psi)^T G^{-1}\overline{\alpha}\overline{\alpha}^T z_1}{\sqrt{z_1^T\overline{\alpha}\overline{\alpha}^T z_1+\delta_1^2}}.$$

In the formula, $J(\Psi)$ is the rotation matrix that transforms the unmanned boat hull coordinate system into a fixed coordinate system; $J(\Psi)^T$ is the transpose matrix of $J(\Psi)$; $\Psi$ represents the heading angle of the unmanned boat; G is the prescribed performance gain matrix; $G^{-1}$ is the inverse matrix of G; $\delta_1$ is a small positive definite parameter; $Z_1$ is the transformed position error vector; $\breve{\alpha}$ is the intermediate control variable for calculating the non-singular finite-time virtual velocity law, and the calculation is performed by using a non-singular finite-time operator.

Further preferably, the adaptive fuzzy approximation term is $$\tau_{mod} = \frac{1}{2}\hat{\sigma}\theta_\tau^T\theta_\tau\hat{e}.$$

In the formula, ê is the speed tracking error;

$$\theta_\tau = \begin{bmatrix} \vartheta_{\tau 1}^T & 0_{1\times l} & 0_{1\times l} \\ 0_{1\times l} & \vartheta_{\tau 2}^T & 0_{1\times l} \\ 0_{1\times l} & 0_{1\times l} & \vartheta_{\tau 3}^T \end{bmatrix}^T,$$

$\hat{\sigma}$ is the optimal estimated value of the two norm of the optimal weight matrix $\sigma=||\omega_\tau^*||^2$, $\hat{\sigma}=\text{diag}(\hat{\sigma}_1,\hat{\sigma}_2,\hat{\sigma}_3)$; $\omega_\tau^*$ and $\delta_{\tau k}$ are respectively the optimal weight and the Gaussian fuzzy basis function used to approximate the unknown model dependency term.

The fuzzy supervisory saturation compensated law is $$\tau_{sup} = -\frac{1}{2}\Upsilon\hat{\phi}\theta_{\Delta\tau}^T\theta_{\Delta\tau}\hat{e}.$$

In the formula, γ is the switching factor based on the saturation command deviation, when γ reaches the set threshold, γ=1, otherwise γ=0; $\theta\Delta\tau^T$, is the transpose matrix of θΔτ, ê is the speed tracking error;

$$\theta_{\Delta\tau} = \begin{bmatrix} \vartheta_{\Delta\tau 1}^T & 0_{1\times l} & 0_{1\times l} \\ 0_{1\times l} & \vartheta_{\Delta\tau 2}^T & 0_{1\times l} \\ 0_{1\times l} & 0_{1\times l} & \vartheta_{\Delta\tau 3}^T \end{bmatrix}^T,$$

$\hat{\gamma}$ is the optimal estimated value of the two norm of the optimal weight matrix $\phi=||\omega_{66\ \gamma}^*||^2$; $\omega_{66\ \gamma}^*$ and $\delta_{\Delta\gamma k}$ are respectively the optimal weight matrix and Gaussian fuzzy basis function for approximating the fuzzy logic system with unknown saturation deviation Δγ; where k is 1, 2 or 3; l is a positive integer; T stands for transpose.

Further preferably, the non-singular finite-time dynamics controller is $$T_{sat} = -\frac{\check{\tau}_{sat}\check{\tau}_{sat}^T\hat{e}}{\sqrt{\hat{e}^T\check{\tau}_{sat}\check{\tau}_{sat}^T\hat{e}+\delta_2^2}}.$$

In the formula, $\delta_2$ is a normal number with a small value; $\check{\tau}_{sat}$ is the calculation of non-singular dynamics intermediate control variables; $\tau_{sat}$ is the control command; ê is the speed tracking error.

The robust term is $\tau_{rob}=-\text{Tanh}(\hat{e})\hat{E}$.

In the formula, Ê is the adaptive estimation term of the compounded disturbances with unknown upper bound; ê is the speed tracking error.

DESCRIPTION OF THE EMBODIMENTS

In order to make the purpose, technical solution and advantages of the present disclosure more comprehensible, the present disclosure will be further described in detail below in conjunction with the accompanying drawings and embodiments. It should be understood that the specific embodiments described here are only used to explain the present disclosure, not to limit the present disclosure.

Figure 1:
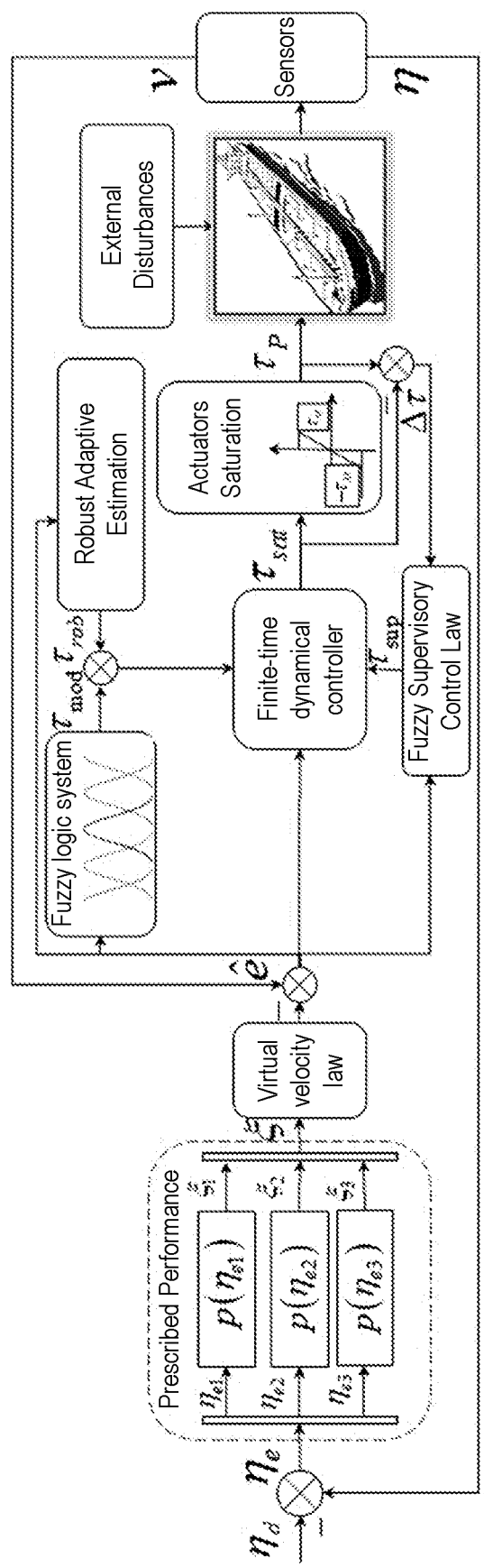
FIG. 1 is a block diagram of a non-singular finite-time control method for prescribed performance dynamic positioning of unmanned boat provided by an embodiment of the present disclosure.

As shown in FIG. 1, the present disclosure provides a non-singular finite-time control method and system for prescribed performance dynamic positioning of unmanned boat. The method aims to achieve error convergence in a finite time while avoiding potential singularity problems. Also, the accuracy of control and safety of unmanned boat are ensured in the process of dynamic positioning through prescribed performance. Firstly, a non-singular finite-time virtual velocity law is designed at the kinematic level to provide reference velocity input for the unmanned boat. Then the minimum parameter learning method is integrated to design a fuzzy supervisory saturation compensated law to deal with the input saturation phenomenon of the actuator. In the meantime, in order to ensure that the unmanned boat is able to accurately track to the reference speed when the model is unknown, an adaptive fuzzy approximation term for the unknown signal of the system is further designed based on the fuzzy logic system of the integrated minimum parameter learning method, so as to eliminate the need for accurate modeling needs. Meanwhile, it is possible to reduce the computational burden. Finally, a non-singular finite-time prescribed performance dynamics controller is designed, which avoids the singularity problem caused by the conventional finite-time power term, so that the tracking error is within the prescribed performance limit in the whole process, and convergence in finite time is achieved for dynamic positioning control of the unmanned boat.

As shown in FIG. 1, a non-singular finite-time control method for prescribed performance dynamic positioning of unmanned boat provided by the present disclosure is specifically as follows:

Step 1 is obtaining a difference between the actual measured position and the desired position of the unmanned boat to obtain the position error of the unmanned boat.

Step 2 is performing prescribed performance transformation after decomposing the unmanned boat position error according to the longitudinal transformation position, lateral transformation position and heading transformation position to obtain prescribed performance error transformation variables.

Step 3 is designing a non-singular finite-time virtual velocity law at the kinematic level to provide reference velocity input for unmanned boats. Specifically:

The designed non-singular finite-time virtual velocity law is as follows $$\alpha = -\frac{J(\psi)^T G^{-1} \overline{\alpha} \overline{\alpha}^T z_1}{\sqrt{z_1^T \overline{\alpha} \overline{\alpha}^T z_1 + \delta_1^2}}.$$

In the formula, $J(\Psi)$ is the rotation matrix that transforms the unmanned boat hull coordinate system into a fixed coordinate system, $$J(\psi) = \begin{bmatrix} \cos\psi & -\sin\psi & 0 \\ \sin\psi & \cos\psi & 0 \\ 0 & 0 & 1 \end{bmatrix},$$

$J(\Psi)^T$ is the transpose matrix of $J(\Psi)$, $\Psi$ represents the heading angle of the unmanned boat; G is the prescribed performance gain matrix; $G^{-1}$ is the inverse matrix of G; $\delta_1$ is a small positive definite parameter that is artificially selected to avoid singularity phenomena; $Z_1$ is the transformed position error vector and defined as follows: $Z_1 = [Z_{11}, Z_{12}, Z_{13}]^T = \xi - \xi_d$.

In the formula, $$\xi = \frac{1}{2} \ln\left(\frac{\chi\beta_u + \beta_l\beta_u}{\beta_l\beta_u - \chi\beta_u}\right);$$

$\xi$ is the prescribed performance transformation variable; $\beta_l$ and $\beta_u$ are the selected control parameters; $X = \eta_e / \rho$; $\eta_e$ is the position error; $\rho$ is the prescribed performance function; $\xi_d[0,0,0]^T$; $Z_{11}, Z_{12}, Z_{13}$ are respectively the longitudinal transformation error, lateral transformation error and heading transformation error between the actual measured position and the desired position of the unmanned boat.

$\check{\alpha}$ is the intermediate control variable shown in the following formula:

$$\check{\alpha} = K_1 Z_1 + \zeta_1(Z_1) - GF.$$

In the formula, $K_1 = \text{diag}(k_{11}, k_{12}, k_{13})$ is the designed positive definite matrix; $F = \eta_e \dot{\rho}/\rho$; $\zeta_1(Z_1) = [\zeta(Z_{11}), \zeta(Z_{12}), \zeta(Z_{13})]^T$ is a piecewise function to avoid singularity, wherein $\zeta(Z_{1i})$ is a non-singular finite-time operator, and is specifically as follows $$\zeta(z_{1i}) = \begin{cases} s_{1i} z_{1i}^{2\gamma} - 1, & |z_{1i}| \geq \varsigma_1 \\ \beta_{1i} z_{1i} + \overline{\beta}_{1i} z_{1i}^3, & |z_{1i}| > \varsigma_1 \end{cases}, i = 1, 2, 3$$

In the formula, $0 < \varsigma_1 < 1$, $\gamma = ((2l-1)/(2l+1))(l > 2, l \in N)$, $\varsigma_1$, and l are all design parameters; N is a positive integer, $\beta_{1i}$ and $\overline{\beta}_{1i}$ are used to ensure the differentiability of the piecewise function $\zeta(Z_{1i})$ at the point $Z_{1i} = \pm\varsigma_1$, and the specifically value thereof is $\beta_{1i} = S_{1i}\varsigma_1^{2\gamma-2}(2-\gamma)$, $\overline{\beta}_{1i} = S_{1i}\varsigma_1^{2\gamma-4}(\gamma-1)$ is a control parameter; $\varsigma_1^{2\gamma-2}(2-\gamma)$ and $\varsigma_1^{2\gamma-4}(\gamma-1)$ are functions provided to avoid singularity and ensure continuousness.

Step 4 is obtaining the difference between the reference speed and the actual measured speed to obtain the speed tracking error.

Step 5 is integrating the minimum parameter learning method to design a fuzzy supervisory saturation compensated law to deal with the input saturation phenomenon of the actuator. Specifically:

$$\tau_{sup} = -\frac{1}{2} \Upsilon \hat{\phi} \theta_{\Delta\tau}^T \theta_{\Delta\tau} \hat{e}.$$

The fuzzy supervisory saturation compensated law is

In the formula, $\gamma$ is the switching factor based on the saturation command deviation, when $\gamma$ reaches the set threshold, $\gamma=1$, otherwise $\gamma=0$; $\theta_{\Delta\tau}^T$, is the transpose matrix of $\theta_{\Delta\tau}$; $\hat{e} = v - \Delta$ is the speed tracking error;

$$\theta_{\Delta\tau} = \begin{bmatrix} \vartheta_{\Delta\tau1}^T & 0_{1\times l} & 0_{1\times l} \\ 0_{1\times l} & \vartheta_{\Delta\tau2}^T & 0_{1\times l} \\ 0_{1\times l} & 0_{1\times l} & \vartheta_{\Delta\tau3}^T \end{bmatrix}^T,$$

$\hat{\phi}$ is the optimal estimated value of the two norm of the optimal weight matrix $\phi = \|\omega_{\Delta\tau}^*\|^2$ and $\delta_{\Delta\tau k}$ are respectively the optimal weight matrix and Gaussian fuzzy basis function for approximating the fuzzy logic system with unknown saturation deviation $\Delta\tau$; k is 1, 2 or 3; l is a positive integer.

$$\Delta\tau = \omega_{\Delta\tau}^{*T} \delta_{\Delta\tau} + \xi_{\Delta\tau}$$

In the formula, $\Delta\tau$ is the deviation between the control command and the saturation limit caused by the input saturation constraint phenomenon, $\omega_{\Delta\tau}^*$ is $\omega_{\Delta\tau}^{*T}$ is the transpose matrix of $\omega_{\Delta\tau}^*$, $\delta_{\Delta\tau} = [\delta_{\Delta\tau1}, \delta_{\Delta\tau2}, \delta_{\Delta\tau3}]$ is a fuzzy basis function, $\xi_{\Delta\tau}$ is a bounded approximation error.

The designed fuzzy adaptive law is $$\dot{\hat{\phi}} = \Gamma_1 \text{Proj}\left(\frac{1}{2} \hat{e}^2 \vartheta_{\Delta\tau}^T \vartheta_{\Delta\tau}, \hat{\phi}\right).$$

In the formula, $\Gamma_1$ is an artificially set normal number; $\delta_{\Delta\tau}^T$ is the transpose matrix of $\delta_{\Delta\tau}$, and $\text{Proj}(\bullet)$ is the projection operator shown in the following formula.

$$\text{Proj}(w, \hat{\phi}) = \begin{cases} w, & p(\hat{\phi}) < 0 \\ w, & p(\hat{\phi}) \geq 0, \frac{\partial p^T}{\partial \hat{\phi}} w \leq 0 \\ w - \frac{p(\hat{\phi}) \frac{\partial p}{\partial \hat{\phi}} \frac{\partial p^T}{\partial \hat{\phi}}}{\left\|\frac{\partial p}{\partial \hat{\phi}}\right\|^2} w, & \text{其{} other} \end{cases}$$

In the formula, $$p(\hat{\phi}) = \frac{\|\hat{\phi}\|^2 - r_\Omega^2}{\varpi^2 + 2\varpi r_\Omega};$$

$r_\Omega$ and $\overline{\omega}$ are the normal constants of the design, and W is a variable in the projection operator.

Step 6 is designing an adaptive fuzzy approximation term for the unknown signal of the system based on the fuzzy logic system of the integrated minimum parameter learning method, so as to eliminate the need for accurate modeling and reduce the computational burden.

The designed adaptive fuzzy approximation term is $$\tau_{mod} = \frac{1}{2} \hat{\sigma} \theta_\tau^T \theta_\tau \hat{e}.$$

In the formula, $$\theta_\tau = \begin{bmatrix} \vartheta_{\tau 1}^T & 0_{1\times l} & 0_{1\times l} \\ 0_{1\times l} & \vartheta_{\tau 2}^T & 0_{1\times l} \\ 0_{1\times l} & 0_{1\times l} & \vartheta_{\tau 3}^T \end{bmatrix}^T,$$

$\hat{\sigma}$ is the optimal estimated value of the two-norm of the ideal weight $\sigma=\|\omega_\tau^*\|^2$, $\hat{\sigma}=\text{diag}(\hat{\sigma}_1,\hat{\sigma}_2,\hat{\sigma}_3)$ ; $\omega_\tau^*$ and $\delta_{\tau k}$ are respectively the ideal weight and the Gaussian fuzzy basis function used to approximate the unknown model dependency term as follows; where k is 1, 2 or 3; l is positive integer.

The unknown model is $Dv+M\dot{\alpha}=\omega_\tau^{*T}\delta_\tau+\xi_\tau$.

In the formula, D is the damping matrix, v is the velocity vector of the unmanned boat in the hull coordinate system, M is the inertia matrix, $\dot{\Delta}$ is the first derivative of the non-singular finite-time virtual velocity law $\Delta$, $\omega_\tau^{*T}$ is the transpose of the matrix $\omega_\tau^*$, $\omega_\tau^*$ refers to the ideal weight matrix of the fuzzy logic system , $\delta_\tau$ is a fuzzy basis function, $\xi_\tau$ represents a bounded estimation error; D and M are dependency terms.

The designed two-norm adaptive law of the fuzzy system is $$\dot{\hat{\sigma}} = \Gamma_2\left(\frac{1}{2}e^2\vartheta_\tau^T\vartheta_\tau - \lambda_2\hat{\sigma}\right).$$

In the formula, $\Gamma_2$, are the set positive parameters.

Step 7 is designing a non-singular finite-time prescribed performance dynamics controller, which avoids the singularity problem caused by the conventional finite-time power term, so that the tracking error is within the prescribed performance limit in the whole process, and convergence in finite time is achieved for dynamic positioning control of the unmanned boat.

The non-singular finite-time dynamical controller is $$\tau_{sat} = -\frac{\check{\tau}_{sat}\check{\tau}_{sat}^T\hat{e}}{\sqrt{\hat{e}^T\check{\tau}_{sat}\check{\tau}_{sat}^T\hat{e}+\delta_2^2}}.$$

In the formula, $\delta_2$ is a normal number with a small value, which may be considered as a setting to avoid singular phenomena; $\check{\tau}_{sat}$ is an intermediate control variable of dynamics, and specifically as follows.

$\check{\tau}_{sat}=J(\Psi)^T G^T Z_1+\tau_{mod}+K_2\hat{e}+\zeta_2(\hat{e})-\tau_{sup}-\tau_{rob}$ In the formula, $K_2$ is a set positive parameter, $\tau_{sup}$ is provided to deal with input saturation, $\tau_{rob}$ is a robust term; $\zeta_2(e)=[\zeta(\hat{e}_1),\zeta(\hat{e}_2),\zeta(\hat{e}_3)]^T$ is a dynamic non-singular finite-time control term; where $\zeta(\hat{e}_i)$ is:

$$\zeta(\hat{e}_i) = \begin{cases} s_{2i}\hat{e}_i^{2\gamma-1}, & |\hat{e}_i| \geq \varsigma_2 \\ \beta_{2i}\hat{e}_i + \bar{\beta}_{2i}\hat{e}_i^3, & |\hat{e}_i| < \varsigma_2 \end{cases}, i=1,2,3$$

In the formula, $S_{2i}$ is the control parameter, $\beta_{2i}$ and $\bar{\beta}_{2i}$ are provided to ensure the differentiability of the piecewise function $\zeta(\hat{e}_i)$ at point $\hat{e}_i=\pm\varsigma_2$, and its specific value is $\beta_{2i}=S_{2i}\varsigma_2^{2\gamma-2}(2-\gamma)$, $\bar{\beta}_{2i}=S_{2i}\varsigma_2^{2\gamma-4}(\gamma-1)$.

In order to ensure the robustness of the closed-loop system under complex disturbances, the robust term is designed as:

$\tau_{rob}=-\text{Tanh}(\hat{e})\hat{E}$

In the formula, $\text{Tanh}(\hat{e})=\text{diag}(\tanh(\hat{e}_1/\Delta),\tanh(\hat{e}_2/\Delta),\tanh(\hat{e}_3/\Delta))$, and $\tanh(*)=(e^*-e^{-*})/(e^*+e^{-*})$, where e represents a natural constant, $\Delta$ is an artificially set normal number; $\hat{E}$ is a adaptive estimation term of the compounded disturbances with an unknown upper bound, and its adaptive law is:

$$\dot{\hat{E}} = \Gamma_3\left(\tanh\left(\frac{\hat{e}_i}{\Delta}\right) - \lambda_3\hat{E}\right)$$

In the formula, $\Gamma_3$ and $\lambda_3$ both are set normal constants.

Step 8 is programming the above control method using C language, and analyzing the information returned by the navigation information determining unit according to the communication protocol, and the navigation information includes, for example, the position and attitude of the unmanned boat. Then, the navigation information obtained by the sensor is calculated to obtain the control output command according to the on-board controller unit. Finally, the control signal is transformed into a signal such as a speed, and the calculated propeller speed command is provided to realize precise dynamic positioning under external environment interference.

The present disclosure provides a non-singular finite-time control system for prescribed performance dynamic positioning of unmanned boat, and the system includes a sensor, a first subtractor, a prescribed performance mapping unit, a second subtractor, a virtual velocity law constructing unit, a fuzzy supervisory compensated constructing unit, a fuzzy logic system constructing unit, a robust adaptive estimation constructing unit, and a non-singular finite-time dynamical controller constructing unit.

The output end of the sensor is connected to the input end of the first subtractor and the second subtractor. The output end of the first subtractor is connected to the input end of the prescribed performance mapping unit. The output end of the prescribed performance mapping unit is connected to the input end of the virtual velocity law constructing unit. The output end of the virtual velocity law constructing unit is connected to the second subtractor. The output end of the second subtractor is connected to the fuzzy supervisory compensated constructing unit, the fuzzy logic system constructing unit, the robust adaptive estimation constructing unit and non-singular finite-time dynamical controller constructing unit.

The sensor is configured to collect the actual measured speed and position of the unmanned boat in real time. The first subtractor is configured to obtain a difference between the actual measured position and the desired position of the unmanned boat to obtain the position error of the unmanned boat.

The prescribed performance mapping unit is configured to perform prescribed performance transformation after decomposing the unmanned boat position error according to the longitudinal transformation position, lateral transformation position and heading transformation position to obtain prescribed performance error transformation variables.

The virtual velocity law constructing unit is configured to construct a non-singular finite-time virtual velocity law as a reference velocity for unmanned boats based on prescribed performance error transformation variables and non-singular finite-time operators.

The second subtractor is configured to obtain the difference between the reference speed and the actual measured speed to obtain the speed tracking error.

The fuzzy supervisory compensated constructing unit is configured to integrate the speed tracking error with the deviation between the control command and the saturation limit to calculate the fuzzy supervisory saturation compensated law by constructing fuzzy supervisory compensated.

The fuzzy logic system constructing unit is configured to integrate the speed tracking error to construct a fuzzy logic system to calculate the adaptive fuzzy approximation term.

The robust adaptive estimation constructing unit is configured to calculate a robust term according to speed tracking error and an adaptive estimation term of compounded disturbances with unknown upper bound.

The non-singular finite-time dynamical controller constructing unit is configured to introduce a kinematically non-singular finite-time control term and combining fuzzy supervisory saturation compensated law, adaptive fuzzy approximation term and robust term to construct a non-singular finite-time dynamical controller to output control commands; the control commands contain a force or a moment pre-applied on the unmanned boat; a force or moment is applied to the unmanned boat to adjust the propeller speed of the unmanned boat, thereby realizing positioning of the unmanned boat.

Further preferably, the non-singular finite-time virtual velocity law is $$\alpha = -\frac{J(\psi)^T G^{-1} \breve{\alpha} \breve{\alpha}^T z_1}{\sqrt{z_1^T \breve{\alpha} \breve{\alpha}^T z_1 + \delta_1^2}}.$$

In the formula, $J(\Psi)$ is the rotation matrix that transforms the unmanned boat hull coordinate system into a fixed coordinate system; $J(\Psi)^T$ is the transpose matrix of $J(\Psi)$ $\Psi$ represents the heading angle of the unmanned boat; G is the prescribed performance gain matrix; $G^{-1}$ is the inverse matrix of G; $\delta_1$ is a small positive definite parameter; $Z_1$ is the transformed position error vector; $\breve{\alpha}$ is the intermediate control variable for calculating the non-singular finite-time virtual velocity law, and the calculation is performed by using a non-singular finite-time operator.

Further preferably, the adaptive fuzzy approximation term is $$\tau_{mod} = \frac{1}{2}\hat{\sigma}\theta_\tau^T \theta_\tau \hat{e}.$$

In the formula, ê is the speed tracking error;

$$\theta_\tau = \begin{bmatrix} \vartheta_{\tau1}^T & 0_{1\times l} & 0_{1\times l} \\ 0_{1\times l} & \vartheta_{\tau2}^T & 0_{1\times l} \\ 0_{1\times l} & 0_{1\times l} & \vartheta_{\tau3}^T \end{bmatrix}^T,$$

$\hat{\sigma}$ is the optimal estimated value of the two norm of the optimal weight matrix $\sigma=\|\omega_\tau^*\|^2$, $\hat{\sigma}=\text{diag}(\hat{\sigma}_1,\hat{\sigma}_2,\hat{\sigma}_3)$; $\omega_\tau^*$ and $\delta_{\tau k}$ are respectively the optimal weight and the Gaussian fuzzy basis function used to approximate the unknown model dependency term.

$$Dv + M\dot{\alpha} = \omega_\tau^{*T}\delta_{96} + \xi_\tau$$

In the formula, D is the damping matrix, v is the velocity vector of the unmanned boat in the hull coordinate system, M is the inertia matrix, $\dot{\alpha}$ is the first derivative of the non-singular finite-time virtual velocity law $\alpha$, $\omega_{96}^{*T}$ is the transpose of the matrix $\omega_\tau^*$, $\omega_\tau^*$ refers to the ideal weight matrix of the fuzzy logic system, $\delta_{96}$ is a fuzzy basis function, $\xi_\tau$ represents a bounded estimation error.

The fuzzy supervisory saturation compensated law is $$\tau_{sup} = -\frac{1}{2}\Upsilon\hat{\phi}\theta_{\Delta\tau}^T\theta_{\Delta\tau}\hat{e}.$$

In the formula, $\gamma$ is the switching factor based on the saturation command deviation, when $\gamma$ reaches the set threshold, $\gamma=1$, otherwise $\gamma=0$; $\theta_{\Delta\tau}^T$ is the transpose matrix of $\theta_{\Delta\tau}$; ê is the speed tracking error;

$$\theta_{\Delta\tau} = \begin{bmatrix} \vartheta_{\Delta\tau1}^T & 0_{1\times l} & 0_{1\times l} \\ 0_{1\times l} & \vartheta_{\Delta\tau2}^T & 0_{1\times l} \\ 0_{1\times l} & 0_{1\times l} & \vartheta_{\Delta\tau3}^T \end{bmatrix}^T,$$

$\hat{\phi}$ is the optimal estimated value of the two norm of the optimal weight matrix are respectively the optimal weight matrix and Gaussian fuzzy basis function for approximating the fuzzy logic system with unknown saturation deviation $\Delta\tau$.

$$\Delta\tau = \omega_{\Delta\tau}^{*T}\delta_{\Delta\tau} + \xi_{\Delta\tau}$$

In the formula, $\Delta\tau$ is the deviation between the control command and the saturation limit caused by the input saturation constraint phenomenon, $\omega_{\Delta\tau}^*$ is the optimal weight matrix, $\omega_{\Delta\tau}^{*T}$ is the transpose matrix of $\omega_{\Delta\tau}^*$, $\delta_{\Delta\tau}=[\delta_{\Delta\tau1}, \delta_{\Delta\tau2},\delta_{\Delta\tau3}]$ is a fuzzy basis function, $\xi_{\Delta\tau}$ is a bounded approximation error.

Further preferably, the non-singular finite-time dynamical controller is $$\tau_{sat} = -\frac{\breve{\tau}_{sat}\breve{\tau}_{sat}^T\hat{e}}{\sqrt{\hat{e}^T\breve{\tau}_{sat}\breve{\tau}_{sat}^T\hat{e} + \delta_2^2}}.$$

In the formula, $\delta_2$ is a normal number with a small value; $\breve{\tau}_{sat}$ sat is the calculation of non-singular dynamics intermediate control variables; $\tau_{sat}$ is the control command; ê is the speed tracking error.

The robust term is $\tau_{rob} = -\text{Tanh}(\hat{e})\hat{E}$.

In the formula, $\hat{E}$ is the adaptive estimation term of the compounded disturbances with the unknown upper bound; ê is the speed tracking error.

Example

In order to verify the effect of the dynamic positioning control method in the present disclosure, a certain unmanned boat was adopted as the simulation object to carry out the following simulation experiments. In order to fully verify the effectiveness of the designed control algorithm, the unmanned boat was set out from two different initial positions in the simulation, and the position 1: $[5m, 5m, 10°]^T$, position 2: $[-5\ m, -5\ m, -10°]^T$.

Figure 2:
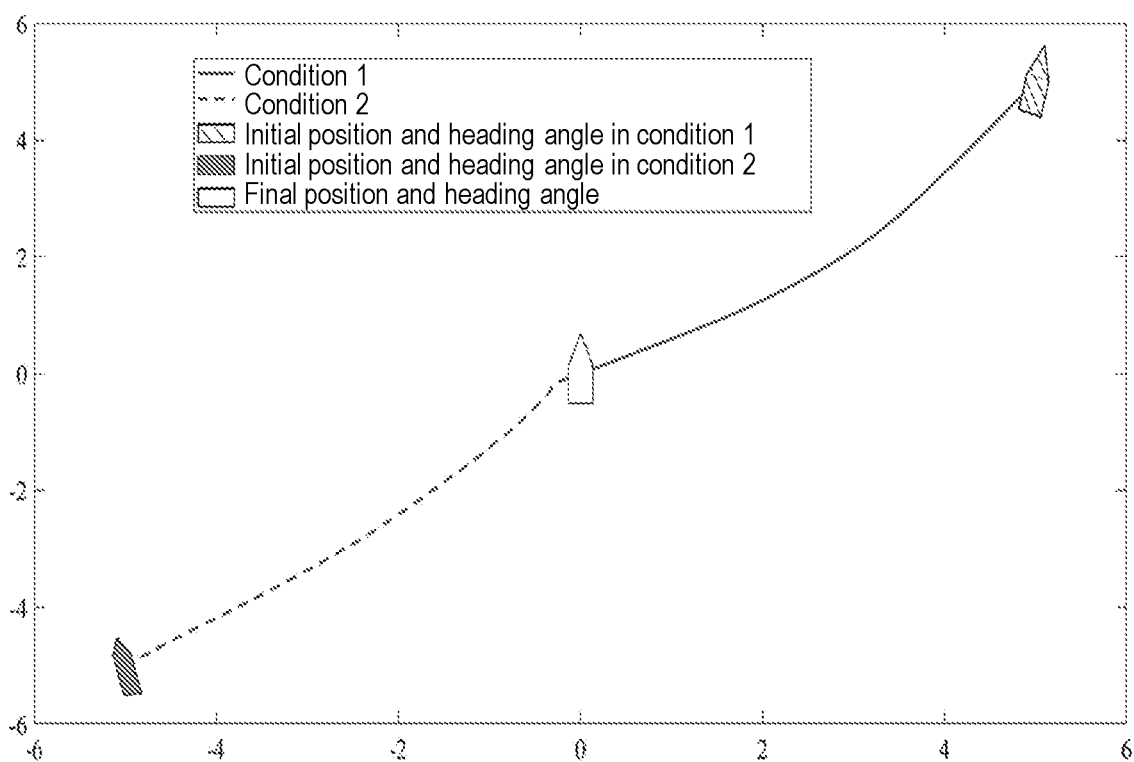
FIG. 2 is a diagram showing dynamic positioning result of an unmanned boat at different initial positions provided by an embodiment of the present disclosure.
Figure 3:
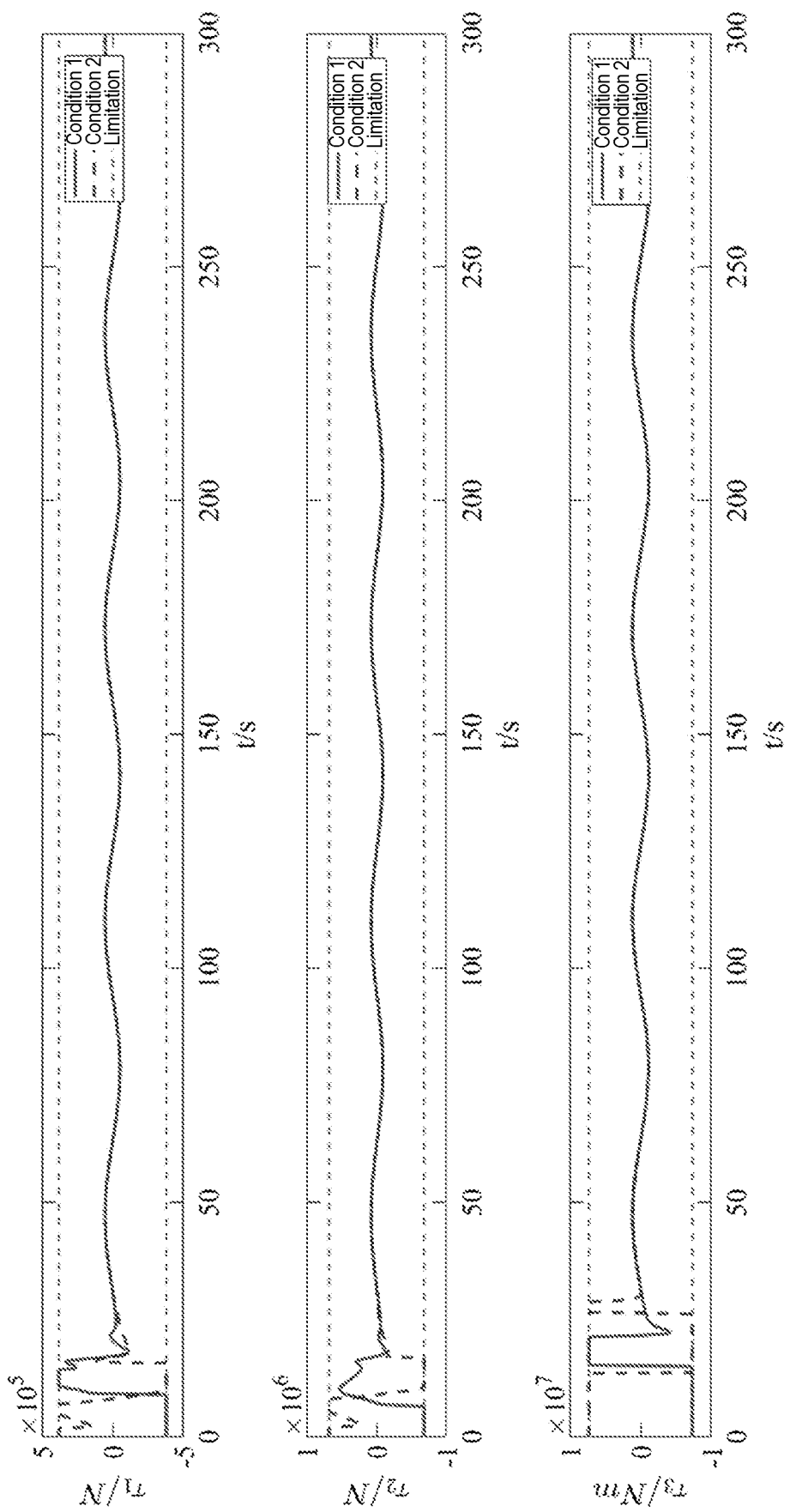
FIG. 3 is a control force curve diagram under different initial conditions provided by an embodiment of the present disclosure.
Figure 4:
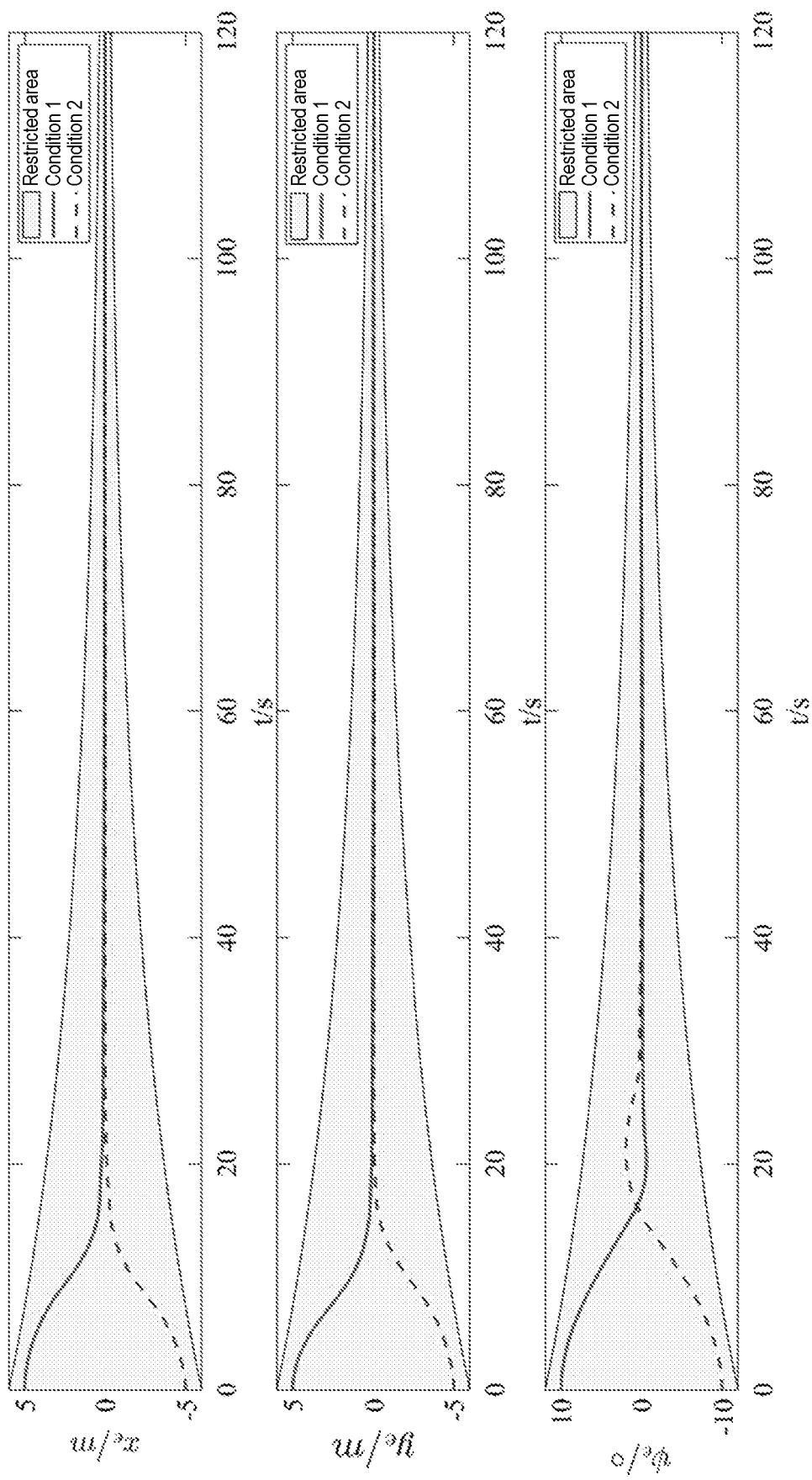
FIG. 4 is a curve diagram of dynamic positioning errors of an unmanned boat at different initial positions provided by an embodiment of the present disclosure.

The simulation results are shown in FIG. 2 to FIG. 4. FIG. 2 is a diagram showing dynamic positioning result of an unmanned boat at different initial positions under the action of non-singular finite-time prescribed performance dynamics controller. FIG. 3 is a control force curve diagram of unmanned boat under different initial conditions. FIG. 4 is a curve diagram of dynamic positioning errors of an unmanned boat at different initial positions. It can be seen that although the unmanned boat starts from different initial conditions, the position of the unmanned boat will gradually converge to the desired position as time goes by, and in the whole process, the lateral, longitudinal and heading errors of the unmanned boat are all within the preset limits that are set in advance, so the safety of the whole process of unmanned boat dynamic positioning is ensured.

Generally speaking, compared with the related art, the above technical solution conceived by the present disclosure has the following advantageous effects.

The non-singular finite-time control method and system for prescribed performance dynamic positioning of unmanned boat provided by the present disclosure adopt the prescribed performance technology $$\left(\xi = \frac{1}{2}\ln\left(\frac{\chi\beta_u + \beta_l\beta_u}{\beta_l\beta_u - \chi\beta_u}\right)\right)$$

to constrain the dynamic top position error, and improve the operation accuracy of unmanned boat. In the meantime, the fuzzy logic system integrated with the minimum parameter learning method estimates the dependency term and 10 saturation deviation of the unmanned boat model parameter matrix (D and M), offsetting the input saturation and unmanned boat model uncertainty while reducing the computational burden. In the design of virtual control law and dynamic controller, the advantage of smooth sign function is adopted for reference, and the intermediate control variable $\breve{\tau}_{sat}$ is used to perform bounded smoothing to obtain $$\tau_{sat} = -\frac{\breve{\tau}_{sat}\breve{\tau}_{sat}^T \hat{e}}{\sqrt{\hat{e}^T \breve{\tau}_{sat}\breve{\tau}_{sat}^T \hat{e} + \delta_2^2}}.$$

Meanwhile, considering that the power term in conventional finite-time control may have singular when the error is zero, a non-singular finite-time term that is switched along with the tracking velocity error is designed in the virtual control law and dynamic controller. By properly constructing the switching function, the continuity of the algorithm at the switching point is ensured while ensuring convergence at finite time. In summary, the present disclosure ensures the non-singular finite-time prescribed performance dynamic positioning control of the unmanned boat in the presence of model uncertainty and input saturation constraints.

It is obvious for those skilled in the art that the above descriptions are only preferred embodiments of the present disclosure, and are not intended to limit the present disclosure. Any modifications, equivalent replacements and improvements made within the spirit and principles of the present disclosure should all be included within the protection scope of the present disclosure.

What is claimed is:

1. A non-singular finite-time control method for prescribed performance dynamic positioning of an unmanned boat, comprising:
   obtaining a difference between an actual measured position and a desired position of the unmanned boat to obtain a position error of the unmanned boat;
   performing a prescribed performance transformation after decomposing the unmanned boat position error according to a longitudinal transformation position, a lateral transformation position and a heading transformation position to obtain prescribed performance error transformation variables;
   constructing a non-singular finite-time virtual velocity law as a reference velocity for the unmanned boat based on the prescribed performance error transformation variables and non-singular finite-time operators;
   obtaining a difference between a reference speed and an actual measured speed to obtain a speed tracking error;
   integrating the speed tracking error with a deviation between a control command and a saturation limit to calculate a fuzzy supervisory saturation compensated law by constructing a fuzzy supervisory compensated;
   integrating the speed tracking error to construct a fuzzy logic system to calculate a adaptive fuzzy approximation term;
   calculating a robust term according to a speed tracking error and an adaptive estimation term of a compounded disturbances with an unknown upper bound;
   introducing a kinematically non-singular finite-time control term and combining the fuzzy supervisory saturation compensated law, the adaptive fuzzy approximation term and the robust term to construct a non-singular finite-time dynamical controller to output control commands; wherein the control commands contain a force or a moment pre-applied on the unmanned boat;
   applying a force or a moment to the unmanned boat to adjust a propeller speed of the unmanned boat, thereby realizing positioning of the unmanned boat.

2. The non-singular finite-time control method for prescribed performance dynamic positioning of the unmanned boat according to claim 1, wherein the non-singular finite-time virtual velocity law is $$\alpha = -\frac{J(\psi)^T G^{-1} \breve{\alpha}\breve{\alpha}^T z_1}{\sqrt{z_1^T \breve{\alpha}\breve{\alpha}^T z_1 + \delta_1^2}},$$

wherein $J(\Psi)$ is a rotation matrix that transforms a unmanned boat hull coordinate system into a fixed coordinate system; $J(\Psi)^T$ is a transpose matrix of $J(\Psi)$; $\Psi$ represents a heading angle of the unmanned boat; G is a prescribed performance gain matrix; $G^{-1}$ is an inverse matrix of G; $\delta_1$ is a small positive definite parameter; $Z_1$ is a transformed position error vector; $\breve{\alpha}$ is an intermediate control variable for calculating the non-singular finite-time virtual velocity law, and the calculation is performed by using a non-singular finite-time operator.

3. The non-singular finite-time control method for prescribed performance dynamic positioning of the unmanned boat according to claim 1, wherein the adaptive fuzzy approximation term is $$\tau_{mod} = \frac{1}{2}\hat{\sigma}\theta_\tau^T \theta_\tau \hat{e},$$

wherein $\hat{e}$ is the speed tracking error;

$$\theta_\tau = \begin{bmatrix} \vartheta_{\tau 1}^T & 0_{1 \times l} & 0_{1 \times l} \\ 0_{1 \times l} & \vartheta_{\tau 2}^T & 0_{1 \times l} \\ 0_{1 \times l} & 0_{1 \times l} & \vartheta_{\tau 3}^T \end{bmatrix}^T,$$

$\hat{\sigma}$ is an optimal estimated value of an two norm of the optimal weight matrix $\sigma = \|\omega_\tau^*\|^2$, $\hat{\sigma} = \text{diag}(\hat{\sigma}_1, \hat{\sigma}_2, \hat{\sigma}_3)$; $\omega_\tau^*$ and $\delta_{\tau k}$ are respectively an optimal weight and a Gaussian fuzzy basis function used to approximate an unknown model dependency term;

the fuzzy supervisory saturation compensated law is $$\tau_{sup} = -\frac{1}{2}\Upsilon\hat{\phi}\theta_{\Delta\tau}^T\theta_{\Delta\tau}\hat{e},$$

wherein $\gamma$ is a switching factor based on a saturation command deviation, when $\gamma$ reaches a set threshold, $\gamma=1$, otherwise $\gamma=0$; $\theta_{\Delta\tau}^T$ is a transpose matrix of $\theta_{\Delta\tau}$;e is the speed tracking error;

$$\theta_{\Delta\tau} = \begin{bmatrix} \vartheta_{\Delta\tau1}^T & 0_{1\times l} & 0_{1\times l} \\ 0_{1\times l} & \vartheta_{\Delta\tau2}^T & 0_{1\times l} \\ 0_{1\times l} & 0_{1\times l} & \vartheta_{\Delta\tau3}^T \end{bmatrix}^T,$$

$\hat{\phi}$ is the optimal estimated value of the two norm of the optimal weight matrix $\phi=\|\omega_{\Delta\tau}^*\|^2$ are respectively the optimal weight matrix and the Gaussian fuzzy basis function for approximating a fuzzy logic system with unknown saturation deviation $\Delta\tau$;

wherein k is 1, 2 or 3; l is a positive integer; T stands for transpose.

4. The non-singular finite-time control method for prescribed performance dynamic positioning of the unmanned boat according to claim 3, wherein the non-singular finite-time dynamics controller is $$\tau_{sat} = -\frac{\breve{\tau}_{sat}\breve{\tau}_{sat}^T\hat{e}}{\sqrt{\hat{e}^T\breve{\tau}_{sat}\breve{\tau}_{sat}^T\hat{e} + \delta_2^2}},$$

wherein $\delta_2$ is a normal number with a small value; $\breve{\tau}_{sat}$ a calculation of non-singular dynamics intermediate control variables; $\tau_{sat}$ is the control command; $\hat{e}$ is the speed tracking error;

the robust term is $\tau_{rob}=-\text{Tanh}(\hat{e})\hat{E}$, wherein $\hat{E}$ is the adaptive estimation term of the compounded disturbances with the unknown upper bound; $\hat{e}$ is the speed tracking error.

5. A non-singular finite-time control system for prescribed performance dynamic positioning of an unmanned boat, comprising: a sensor, a first subtractor, a prescribed performance mapping unit, a second subtractor, a virtual velocity law construction unit, a fuzzy supervisory compensated constructing unit, a fuzzy logic system constructing unit, a robust adaptive estimation constructing unit, and a non-singular finite-time dynamical controller constructing unit;

an output end of the sensor is connected to an input end of the first subtractor and the second subtractor; an output end of the first subtractor is connected to an input end of the prescribed performance mapping unit; an output end of the prescribed performance mapping unit is connected to an input end of the virtual velocity law constructing unit, an output end of the virtual velocity law constructing unit is connected to the second subtractor; an output end of the second subtractor is connected to the fuzzy supervisory compensated constructing unit, the fuzzy logic system constructing unit, the robust adaptive estimation constructing unit and the non-singular finite-time dynamical controller constructing unit;

wherein the sensor is provided to collect an actual measured speed and a position of the unmanned boat in real time, the first subtractor is provided to obtain a difference between the actual measured position and a desired position of the unmanned boat to obtain a position error of the unmanned boat;

the prescribed performance mapping unit is provided to perform a prescribed performance transformation after decomposing the unmanned boat position error according to a longitudinal transformation position, a lateral transformation position and a heading transformation position to obtain prescribed performance error transformation variables;

the virtual speed law constructing unit is provided to construct a non-singular finite-time virtual velocity law as a reference velocity for the unmanned boat based on the prescribed performance error transformation variables and non-singular finite-time operators;

the second subtractor is provided to obtain a difference between a reference speed and an actual measured speed to obtain a speed tracking error;

the fuzzy supervisory compensated constructing unit is provided to integrate the speed tracking error with a deviation between a control command and a saturation limit to calculate a fuzzy supervisory saturation compensated law by constructing a fuzzy supervisory compensated;

the fuzzy logic system constructing unit is provided to integrate the speed tracking error to construct a fuzzy logic system to calculate a adaptive fuzzy approximation term;

the robust adaptive estimation constructing unit is provided to calculate a robust term according to a speed tracking error and a adaptive estimation term of a compounded disturbances with an unknown upper bound;

the non-singular finite-time dynamical controller constructing unit is provided to introduce a kinematically non-singular finite-time control term and combine the fuzzy supervisory saturation compensated law, the adaptive fuzzy approximation term and the robust term to construct a non-singular finite-time dynamical controller to output control commands; wherein the control commands contain a force or a moment pre-applied on the unmanned boat; wherein the force or the moment is applied to the unmanned boat to adjust a propeller speed of the unmanned boat, thereby realizing positioning of the unmanned boat.

6. The non-singular finite-time control system for prescribed performance dynamic positioning of the unmanned boat according to claim 5, wherein the non-singular finite-time virtual velocity law is $$\alpha = -\frac{J(\psi)^T G^{-1}\breve{\alpha}\breve{\alpha}^T z_1}{\sqrt{z_1^T\breve{\alpha}\breve{\alpha}^T z_1 + \delta_1^2}},$$

wherein $J(\Psi)$; $\Psi$ is a rotation matrix that transforms a unmanned boat hull coordinate system into a fixed coordinate system;) is a transpose matrix of $J(\Psi)$; $\Psi$ represents a heading angle of the unmanned boat; G is a prescribed performance gain matrix; $G^1$ is an inverse matrix of G; $\delta_1$ is a small positive definite parameter; $Z_1$ is a transformed position error vector; $\breve{\alpha}$ is an intermediate control variable for calculating the non-singular finite-time virtual velocity law, and the calculation is performed by using a non-singular finite-time operator.

7. The non-singular finite-time control system for prescribed performance dynamic positioning of the unmanned boat according to claim 5, wherein the adaptive fuzzy approximation term is $$\tau_{mod} = \frac{1}{2}\hat{\sigma}\theta_\tau^T\theta_\tau \hat{e},$$

wherein $\hat{e}$ is the speed tracking error;

$$\theta_\tau = \begin{bmatrix} \vartheta_{\tau 1}^T & 0_{1\times l} & 0_{1\times l} \\ 0_{1\times l} & \vartheta_{\tau 2}^T & 0_{1\times l} \\ 0_{1\times l} & 0_{1\times l} & \vartheta_{\tau 3}^T \end{bmatrix}^T,$$

$\hat{\delta}$ is an optimal estimated value of an two norm of the optimal weight matrix $\delta=||\omega_\tau^*||^2$, $\hat{\delta}=\mathrm{diag}(\hat{\delta}_1,\hat{\delta}_2,\hat{\delta}_3)$; $\omega_\tau^*$ and $\delta_{\tau k}$ are respectively an optimal weight and a Gaussian fuzzy basis function used to approximate an unknown model dependency term;

the fuzzy supervisory saturation compensated law is $$\tau_{sup} = -\frac{1}{2}\Upsilon\hat{\phi}\theta_{\Delta\tau}^T\theta_{\Delta\tau}\hat{e},$$

wherein $\gamma$ is a switching factor based on a saturation command deviation, when $\gamma$ reaches a set threshold, $\gamma=1$, otherwise $\gamma=0$; $\theta_{\Delta\tau}^T$ is a transpose matrix of $\theta_{\Delta\tau}$; $\hat{e}$ is the speed tracking error;

$$\theta_{\Delta\tau} = \begin{bmatrix} \vartheta_{\Delta\tau 1}^T & 0_{1\times l} & 0_{1\times l} \\ 0_{1\times l} & \vartheta_{\Delta\tau 2}^T & 0_{1\times l} \\ 0_{1\times l} & 0_{1\times l} & \vartheta_{\Delta\tau 3}^T \end{bmatrix}^T,$$

$\hat{\phi}$ is the optimal estimated value of the two norm of the optimal weight matrix $\phi=||\omega_{\Delta\tau}^*||^2$; $\omega_{\Delta\tau}^*$ and $\delta_{\Delta\tau k}$ are respectively the optimal weight matrix and the Gaussian fuzzy basis function for approximating a fuzzy logic system with unknown saturation deviation $\Delta\tau$;

wherein k is 1, 2 or 3; l is a positive integer; T stands for transpose.

8. The non-singular finite-time control system for prescribed performance dynamic positioning of the unmanned boat according to claim 7, wherein the non-singular finite-time dynamics controller is $$\tau_{sat} = -\frac{\breve{\tau}_{sat}\bar{\tau}_{sat}^T\hat{e}}{\sqrt{\hat{e}^T\breve{\tau}_{sat}\bar{\tau}_{sat}^T\hat{e}+\delta_2^2}},$$

wherein $\delta_2$ is a normal number with a small value; $\breve{\tau}_{sat}$ is a calculation of non-singular dynamics intermediate control variables; $\tau_{sat}$ is the control command; $\hat{e}$ is the speed tracking error;

the robust term is $\tau_{rob}=-\mathrm{Tanh}(\hat{e})\hat{E}$.

wherein $\hat{E}$ is the adaptive estimation term of the compounded disturbances with the unknown upper bound; $\hat{e}$ is the speed tracking error.

* * * * *